United States Patent [19]
Anderson

[11] 3,984,819
[45] Oct. 5, 1976

[54] DATA PROCESSING INTERCONNECTION TECHNIQUES

[75] Inventor: George A. Anderson, Minneapolis, Minn.

[73] Assignee: Honeywell Inc., Minneapolis, Minn.

[22] Filed: Mar. 8, 1976

[21] Appl. No.: 664,594

Related U.S. Application Data

[63] Continuation of Ser. No. 475,932, June 3, 1974, abandoned.

[52] U.S. Cl. ............................................. 340/172.5
[51] Int. Cl.² ...................... G06F 15/16; G06F 3/00
[58] Field of Search ...................... 340/172.5; 445/1

[56] References Cited
UNITED STATES PATENTS

| | | | |
|---|---|---|---|
| 3,386,082 | 5/1968 | Stafford et al. | 340/172.5 |
| 3,421,150 | 1/1969 | Quosig et al. | 340/172.5 |
| 3,480,914 | 11/1969 | Schlaeppi | 340/172.5 |
| 3,551,892 | 12/1970 | Driscoll | 340/172.5 |
| 3,638,198 | 1/1972 | Balogh | 340/172.5 |
| 3,641,505 | 2/1972 | Artz et al. | 340/172.5 |
| 3,643,223 | 2/1972 | Ruth et al. | 340/172.5 |
| 3,876,987 | 4/1975 | Dalton et al. | 340/172.5 |
| 3,882,455 | 5/1975 | Heck et al. | 340/172.5 X |

*Primary Examiner*—Mark E. Nusbaum
*Attorney, Agent, or Firm*—Henry L. Hanson

[57] ABSTRACT

The disclosure describes an interconnection switching matrix for a data processing system which includes system resource units or processor units. Each processor unit is equipped with an interface and has the ability to control the switching matrix either by means of a stored program or on command from another processor unit. The switching matrix includes means for switching a plurality of buses between different interfaces of the units and for connecting the buses to each other. By using this technique, each unit may operate independently, predetermined units may communicate with each other to the exclusion of other units, or all units may simultaneously communicate with each other.

10 Claims, 9 Drawing Figures

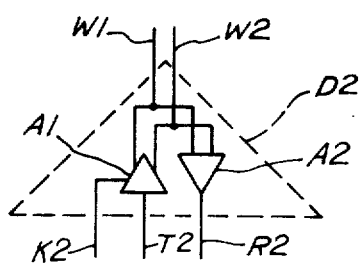
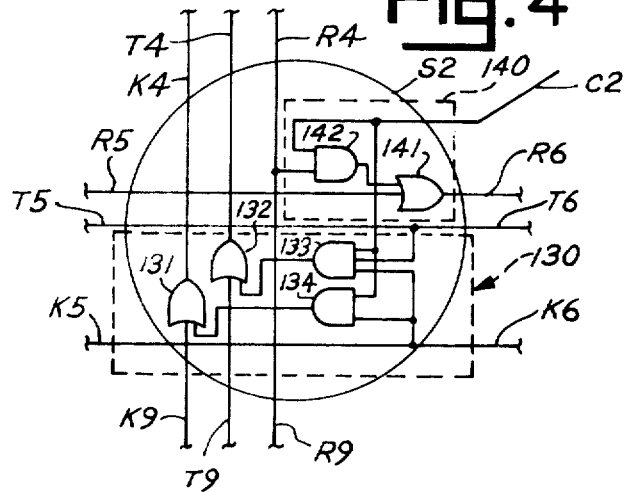
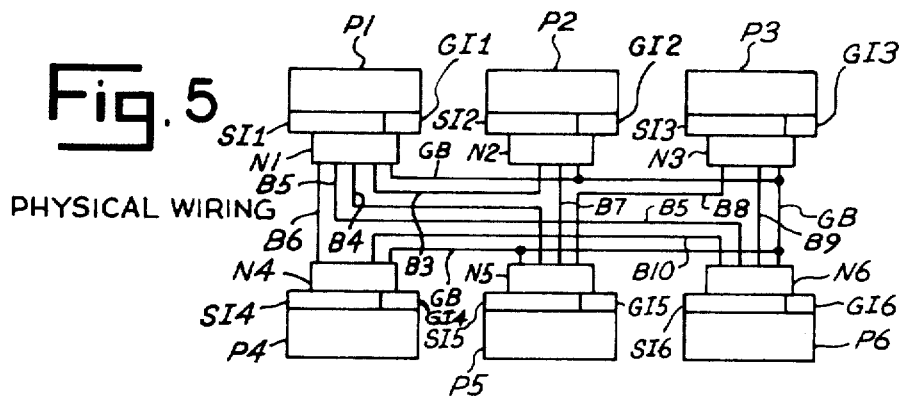
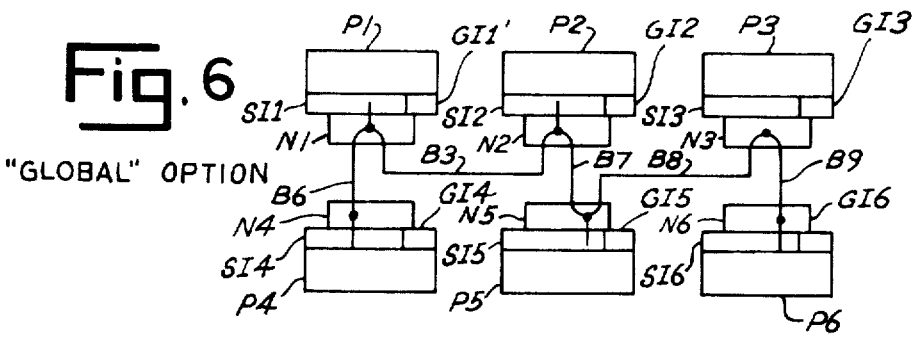
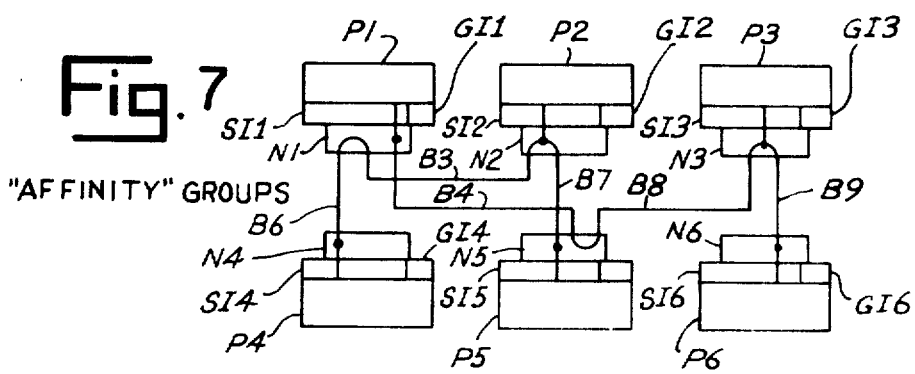

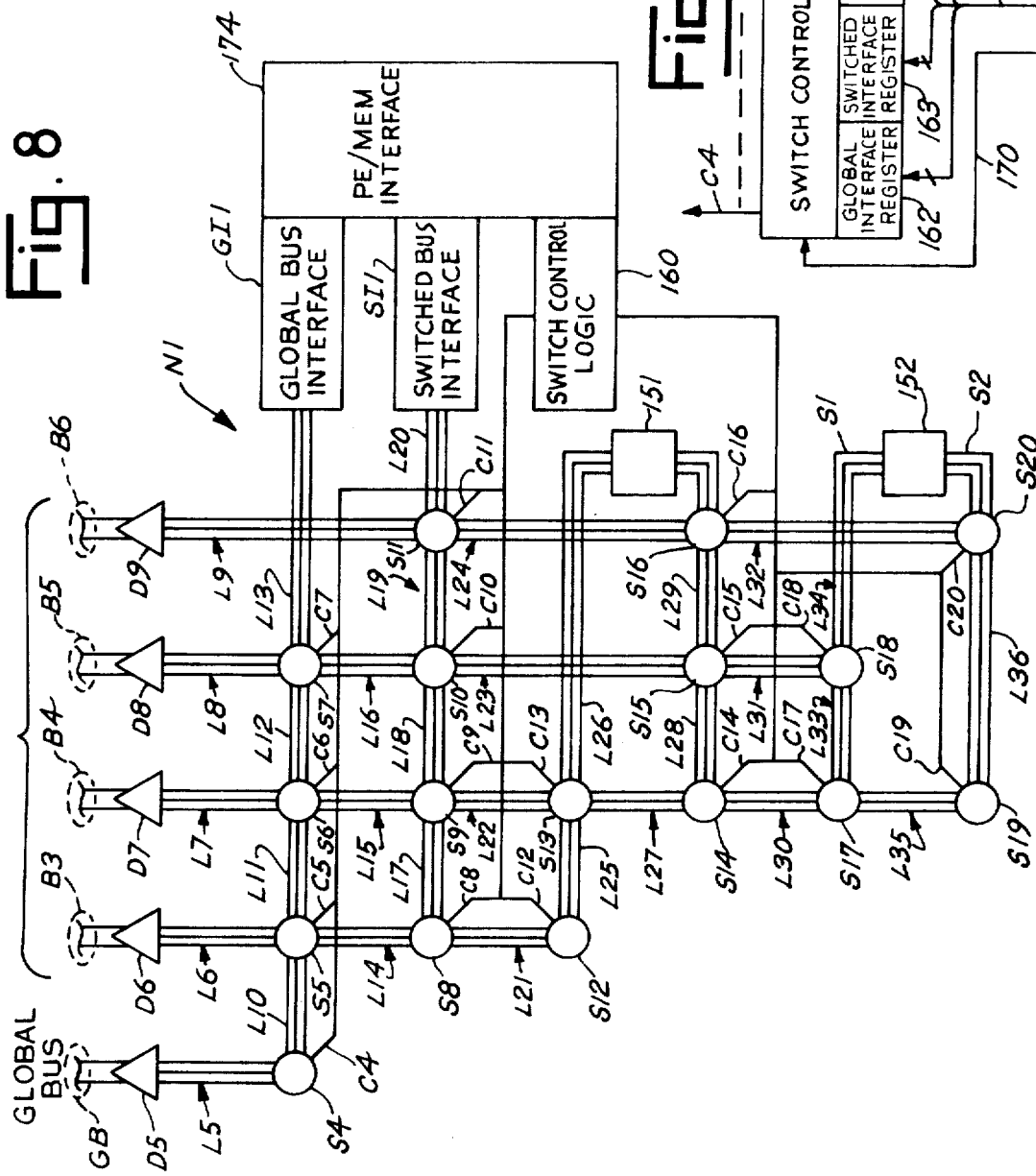

DATA PROCESSING INTERCONNECTION TECHNIQUES

The invention herein described was made in the course of or under a contract or subcontract thereunder with the U.S. Government, Department of the Air Force.

This is a continuation of application Ser. No. 475,932, filed June 3, 1974, now abandoned.

BACKGROUND AND SUMMARY OF THE INVENTION

This invention relates to data processing systems and more particularly relates to techniques for interconnecting the buses which link data processor units with system resource units or other processor units.

A system resource unit is a device capable of communicating by means of digital data with another system resource unit or a processor unit. A processor unit is a device which can control a switch means either by a program stored in the processor unit or by a command received from another processor unit. Of course, a processor unit is a more specific type of resource unit.

The general concept of connecting a number of processor units or system resource units to form an integrated computing system has been under study in the field of data processing architecture for some time. One of the problems impeding the development of such architecture has been the lack of a versatile and comprehensive means for interconnecting the units of the system. In the past, the units have generally been connected by buses that are physically fixed in relationship to the various units. Although this arrangement may be adequate for some uses of the system, it lacks the flexibility required for certain applications, such as the interconnection of processor units or resource units used to control aircraft.

The applicant has found that an aircraft control system employing multiple processor or resource units requires a variety of interconnection features. For example, the system requires executive control of all units to effect scheduling, resource allocation and general system control. Since a number of units might be working on a single functional or logical process, there is a need for high speed communication between small groups of units. However, the number of units in the groups and the composition of the groups change from time-to-time. There is also a need for logical process intercommunication. For example, certain types of data, such as aircraft state vector, need to be communicated between groups of units operating on different functional or logical problems. In addition, since individual units may break down from time-to-time, there must be provision for fault detection and reconfiguration of the units to minimize aircraft malfunction due to the break down.

In order to achieve the foregoing objectives, the applicant has invented an improved bus interconnection technique for a data processing system including multiple processor or resource units. According to this technique, the units may be operated individually, or they may simultaneously be in communication with each other. In addition, the techinque has the capability of communicating certain kinds of data to all of the units and simultaneously communicating other kinds of data to only certain units of the overall system.

According to one feature of the invention, the data processing system comprises first and second resource units and a processor unit including first, second and third interfaces respectively. In order to provide communication between the units, a first bus is connected to the first interface, and a second bus is connected to the second interface. Switch means that are switchable into a number of states provide versatile combination of unit interconnections. For exmple, the switch means can be switchable into a first state for connecting the first bus to the third interface so that the first resource unit and the processor unit communicate over the first bus. Alternatively, the switch means can interconnect the second bus to the third interface so that the second resource unit and the processor unit communicate over the second bus. The first and second buses can also be connected together and simultaneously disconnected from the third interface so that the first and second resource units communicate with each other while the processor unit operates independently. Likewise, the first and second buses can be connected together and to the third interface so that the first and second resource units and the processor unit simultaneously communicate with each other.

According to another feature of the invention, the first and second resource units and the processor unit can each include first, second and third global interfaces respectively. In such a system, a global bus can be provided with a switch which simultaneously connects the first, second and third global interfaces to the global bus, so that each of the units may receive or transmit messages over the global bus or over the first or second buses.

The advantages of the foregoing system will be apparent to those skilled in the art. By using such techniques, multiple units may be interconnected in a wide variety of useful networks to maximize the speed and convenience with which data is processed. In addition, the interconnection of the units may be altered under program control to accommodate changes in the type of information being processed.

DESCRIPTION OF THE DRAWINGS

These and other objects, advantages and features of the present invention will appear in connection with the accompanying drawings wherein:

FIG. 3 is an electrical schematic drawing of a preferred form of bus driver used in the system shown in FIG. 1;

FIG. 4 is an electrical schematic drawing of a preferred form of gate switch used in the system shown in FIG. 1;

FIG. 5 is a block diagram schematic drawing of an alternative embodiment of the present invention employing a global bus and multiple processor units;

FIG. 6 is a block diagram schematic drawings illustrating one way in which the embodiment of FIG. 5 can be used to interconnect the processor units;

FIG. 7 is a block diagram schematic drawing illustrating another way in which the embodiment of FIG. 5 can be used to interconnect the processor units;

FIG. 8 is an electrical schematic drawing illustrating a preferred form of switching and interface circuit used in connection with one of the processor units shown in FIG. 5; and FIG. 9 is a block diagram schematic drawing of certain control registers illustrated in FIG. 8.

DESCRIPTION OF THE PREFERRED EMBODIMENT

Figure 1:
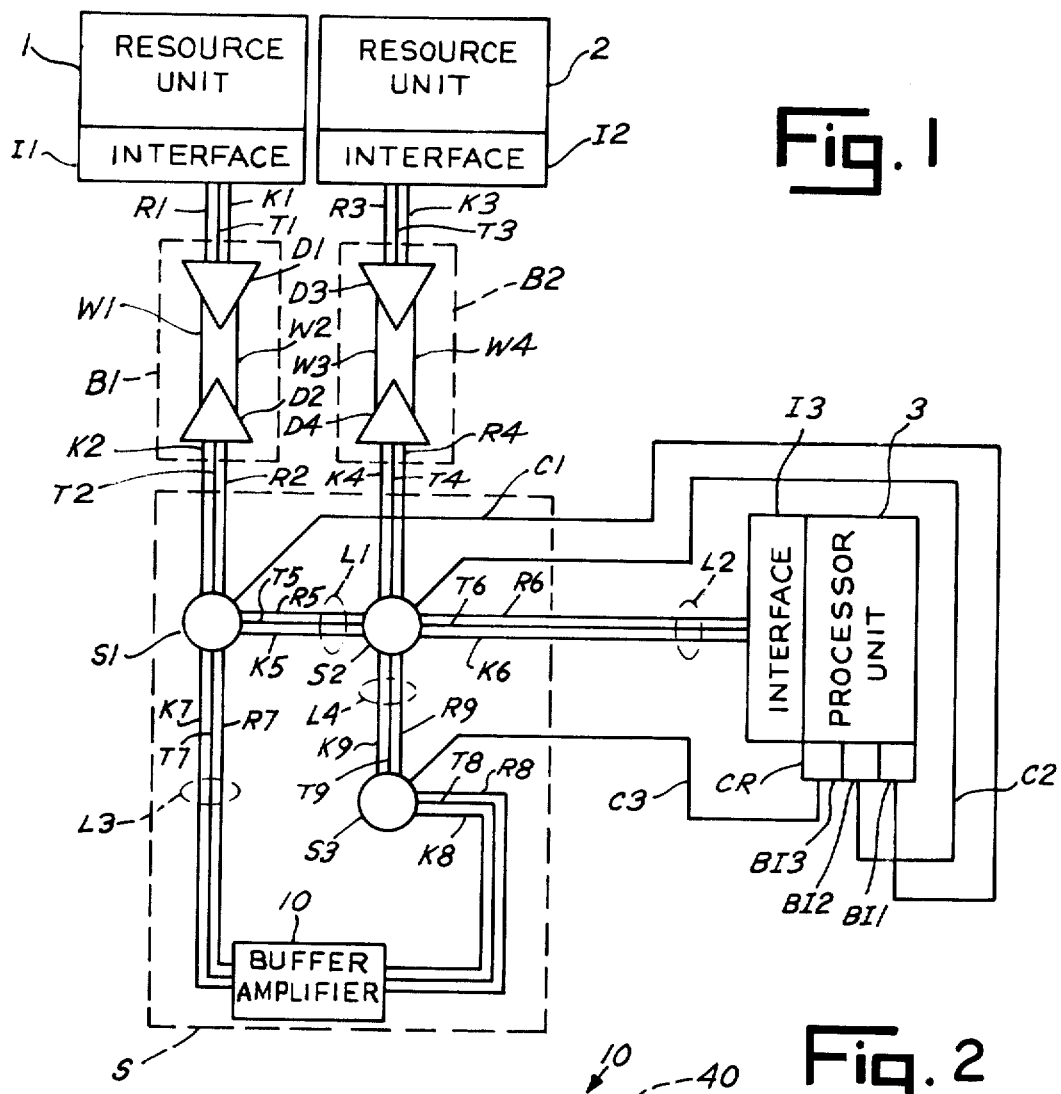
FIG. 1 is a block diagram schematic drawing of a preferred form of processing system made in accordance with the present invention.

Referring to FIG. 1, a preferred form of data processing system made in accordance with the present invention comprises a resource unit 1 having an interface 11, a resource unit 2 having an interface 12 and a processor unit 3 having an interface 13.

Resource units 1 and 2 comprise a conventional peripheral device, such as a printer, card reader or disk memory storage unit capable of transmitting and receiving digital data. Processor unit 3 comprises a computer having an arithmetic unit and a memory for storing digital data. Units 1 and 2 can also comprise a processor unit like unit 3. Interface 11–13 are conventional computer ports capable of transmitting information into and out of their associated units.

A preferred form of apparatus for interconnecting the units basically includes buses B1 and B2, a switching network S and a control register CR.

Bus B1 comprises receive conductors R1 and R2, transmitter conductors T1 and T2 and key conductors K1 and K2. Data on the conductors is amplified and conditioned by conventional driver units D1 and D2 so that data is transmitted over conductors W1 and W2.

Bus B2 comprises receive conductors R3 and R4, transmitter conductors T3 and T4, and key conductors K3 and K4. Conventional driver units D3 and D4, identical to units D1 and D2, transmit data over conductors W3 and W4 in a well-known manner.

Conductors W1 and W2 transmit identical data. However, the data on conductor W1 is 180° out of phase with the data on conductor W2 in order to reduce the signal-to-noise ratio of the transmitted messages. In order to further reduce the signal-to-noise ratio, a Manchester biphase code may be used to transmit the messages. Conductors W3 and W4 have the same message format as conductors W1 and W2.

Driver unit D2 is shown in more detail in FIG. 3. The driver unit comprises a line driver amplifier A1 similar to model numbers SN55109 or SN55110 manufactured by Texas Instruments, Inc. A receive driver A2 may be a conventional amplifier unit, such as model SN55107A or SN55108A manufactured by Texas Instrutments, Inc.

The model numbers of amplifier A1 and driver A2 are described in *The Integrated Circuits Catalog For Design Engineers*, First Edition, publication No. cc401, 10072-41-U.S.

Referring to FIG. 1, switching network S comprises gate switches S1, S2 and S3 which are interconnected by communication links L1–L4. Link L1 comprises a receive conductor R5, a transmitter conductor T5 and a key conductor K5; link L2 comprises a receive conductor R6, a transmitter conductor T6 and a key conductor K6; and link L4 comprises a receive conductor R9, a transmitter conductor T9 and a key conductor K9. Link L3 comprises a buffer amplifier 10 capable of transmitting data in opposite directions, as well as receive conductors R7, R8, transmitter conductors T7, T8 and key conductors K7, K8.

Figure 2:
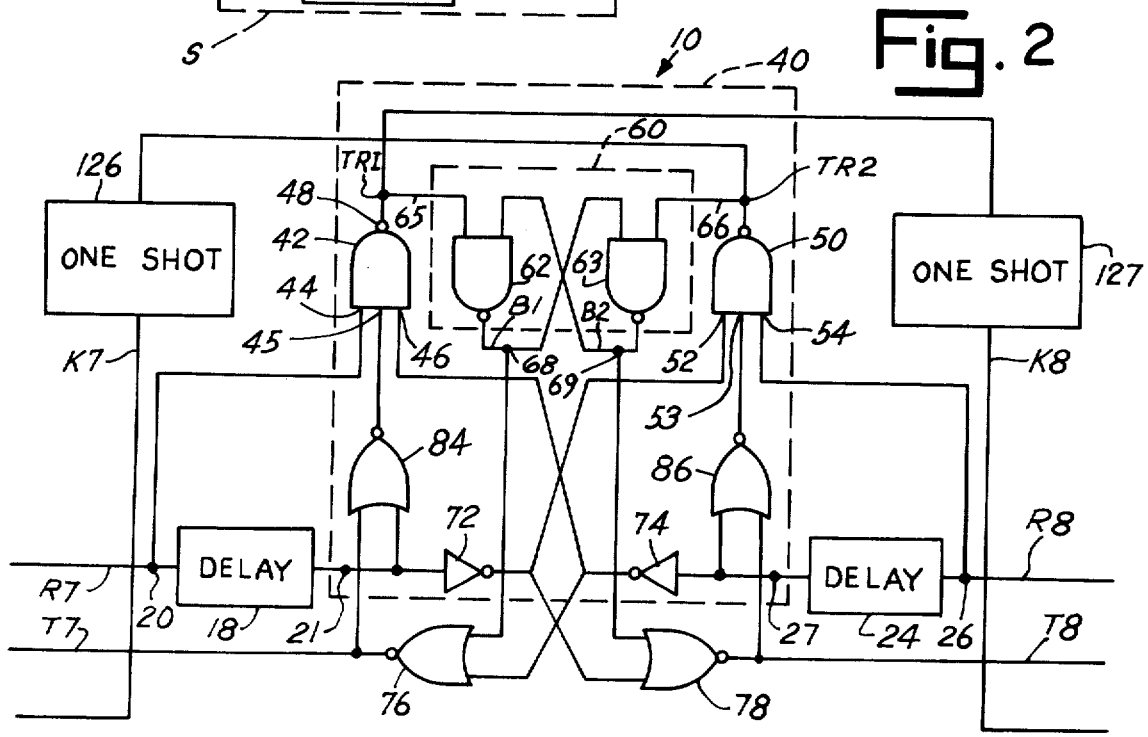
FIG. 2 is an electrical schematic drawing of a preferred form of buffer amplifier used in the system shows in FIG. 1.

Referring to FIG. 2, a preferred form of buffer amplifier 10 capable of transmitting pulses between the two ends of link L3 without external controls comprises a conventional delay circuit 18 having an input terminal 20 and an output terminal 21, and an identical delay circuit 24 having an input terminal 26 and an output terminal 27.

The amplifier also comprises a command circuit 40. The command circuit includes a NAND gate 42 which generates a trigger signal TR1 on an output terminal 48 depending on the states of inputs 44–46, and an identical NAND gate 50 which generates another trigger signal TR2 on an output terminal 56 depending on the states of inputs 52–54. Trigger signals TR1 and TR2 control a bistable flipflop 60 comprising NAND gates 62 and 63. Flipflop 60 has inputs 65 and 66 and outputs 68 and 69 which generate complementary command signals B1 and B2.

A one slot 127 generates a key signal on conductor K8 in response to the TR1 signal, and another one shot 128 generates a second key signal on conductor K7 in response to the TR2 signal.

The delayed signals generated on output terminals 21 and 27 are inverted by inverters 72 and 74, respectively, and are thereafter transmitted to transmitting NOR gates 76 and 78, respectively.

Control NOR gates 84 and 86 condition inputs 45 and 53, respectively, in order to control the generation of trigger signals TR1 and TR2.

Basically, the buffer amplifier transmits pulses on receive conductor R7 to transmitter conductor T8 and transmits pulses on receive conductor R8 to transmitter conductor T7. The method of operation of the buffer amplifier is more fully described in my copending application Ser. No. 475,931, entitled "Bidirectional Buffer Amplifier", filed June 3, 1974, now abandoned.

Referring to FIG. 4, a preferred form of gate switch S2 is shown in detail. The gate switch comprises a logic circuit 130 including OR gates 131 and 132 and AND gates 133, 134. The switch also comprises another logic circuit 140 including an OR gate 141 and an AND gate 142. It should be noted that conductors T5, T6; K5, K6; and R4, R9 are connected together so that data flows in both directions from one conductor to the other. In addition, data always is capable of flowing from conductors K9 and T9 to conductors K4 and T4, respectively, due to the operation of OR gates 131 and 132. Information also always is capable of flowing from conductor R5 to conductor R6 due to the operation of OR gate 141. However, information can only flow from conductors K6 and T6 to conductors K4 and T4, respectively, if control conductor C2 is switched to a logical 1 state. Likewise, information only can flow from conductor R4 to conductor R6 if control conductor C2 is switched to a logical 1 state. Those skilled in the art will recognize that gate switches S1 and S3 are constructed in an analogous manner to gate switch S2. When control conductor C2 is in a logical 0 state, gate switch S2 is in its normal state in which data flows in a vertical direction or horizontal direction (as shown in FIG. 4). For example, referring to FIG. 1, when control conductor C2 is in a logical 0 state, information normally flows in either direction between bus B2 and link L4 and between links L1 and L2. However, referring again to FIG. 4, information will not change direction from horizontal to vertical or vice-versa as long as control conductor C2 is switched to a logical 0 state.

If conductor C2 is in a logical 1 state, gate switch S2 is said to be in a switched state in which information can flow from a horizontal to a vertical direction and vice-versa (as viewed in FIG. 4). For example, control conductor C2 must be switched to a logical 1 state in order to transmit information between link L2 and bus B2.

Referring to FIG. 1, register CR is a conventional 3 stage register comprising bit positions BI1–BI3 which control the states of control conductors C1–C3, respectively. The units 1–3 and buses in communication with each other during each of the states of register CR are shown in the following Table A.

consisting of buses B6, B3, B7, B8 and B9. In addition, processor units P1–P6 can be arranged by the switching networks in affinity groups as illustrated in FIG. 7. That is, processor units P2, P4 and P5 can simultaneously communicate with each other by time-sharing techniques over buses B6, B3 and B7. At the same time, processor units P1, P3 and P6 can simultaneously communicate by time-sharing techniques over buses B4, B8 and B9. In the FIG. 7 arrangement, switching networks

TABLE A

| States of Register CR | | | Units In Communication With Each Other | Bus(s) In Use | Gate Switches In Switched State |
|---|---|---|---|---|---|
| BI3 | BI2 | BI1 | | | |
| 0 | 0 | 1 | 1 and 3 | B1 | S1 |
| 0 | 1 | 0 | 2 and 3 | B2 | S2 |
| 1 | 0 | 0 | 1 and 2 | B1 and B2 | S3 |
| 1 | 0 | 1 | 1, 2 and 3 | B1 and B2 | S1 and S3 |
| 1 | 1 | 0 | 1, 2 and 3 | B1 and B2 | S2 and S3 |
| 0 | 0 | 0 | NONE | NONE | NONE |

It should be noted that suitable impedance matching devices or amplifiers may be inserted between register CR and gate switches S1–S3 in order to drive control conductors C1–C3, respectively. As noted in Table A, when register CR is in the 001 state, switch S1 is in the switched state so that information flows from bus B1 through gate switch S1 to link L1 and through switch S2 to link L2. When register CR is in the 010 state, switch S is in the switched state so that information flows from bus B2 through gate switch S2 to link L2 and vice-versa. When register CR is in state 100, gate switch S2 is in the switched state so that information flows through bus B1, gate switch S1, buffer amplifier 10, gate switch S3 and gate switch S2 to bus B2, and vice-versa. When register CR is in the 101 state, gate switches S1 and S3 are in their switched states so that information flows between buses B1 and B2 through buffer amplifier 10 in the manner previously described for the 100 state, and information also flows from bus B1 through gate switch S1 and gate switch S2 to link L2 in the manner previously described for the 001 state. When register CR is in the 110 state, gater switches S2 and S3 are in their switched states so that information flows between buses B1 and B2 through buffer amplifier 10 in the manner previously described for the 100 state, and information also flows from bus B2 through gate switch S2 to link L2, and vice-versa, in the manner previously described for the 010 state. When register CR is in the 000 state, none of the gate switches is in the switched state, and each of units 1–3 operates independently.

FIG. 5 describes a hybrid bus system consisting of a global time-shared bus GB supported by a network of switchable local buses B3–B10. The bus system can be used to control processor units P1–P6, each of which has both computational and memory capabilities. Processor units P1–P6 include switched interfaces SI1–SI6 and global interfaces GI1–GI6, respectively. Switching networks N1–N6 associated with processor units P1–P6, respectively, interconnect the various buses with the processor units. The system described in FIG. 5 enables the processor units to be interconnected in a variety of different ways. For example, bus GB can be used as a global bus which allows simultaneous, time-shared intercommunication between all the processor units. Alternatively, the switched buses B3–B10 can be interconnected by the switching networks in the manner shown in FIG. 6 to provide another global bus N1 and N5 act as conduits for messages without completing a connection to their associated processor units P1 and P5, respectively. However, in the FIG. 6 arrangement, networks N1 and N5 act both as conduits and as switches for connecting processor units P1 and P5 to the bus system.

FIG. 8 illustrates in more detail switching network N1 which can be used to interconnect processor unit P1 with other processor units illustrated in FIG. 5.

As shown in FIG. 8, buses GB, B3, B4, B5 and B6 comprise driver units D5–D9, respectively, as well as communication links L5–L9, respectively. Driver units D5–D9 are each identical to driver unit D2, and links L5–L9 are each identical to the link comprising conductors R2, T2 and K2 illustrated in FIGS. 1 and 3.

Switching network N1 comprises gate switches S4–S20, each of which can be designed like switch S2 shown in FIG. 4, and communication links L10–L36 which are designed in the same manner as the links illustrated in FIG. 1. Gate switches S4–S20 are controlled by control conductors C4–C20, respectively, in the same manner as conductor C2 controls gate switch S2 (FIG. 4).

The network includes buffer amplifiers 151 and 152 connected as shown. Buffer amplifiers 151 and 152 are designed in the same manner as buffer amplifier 10 illustrated in FIG. 2. Switching network N1 is interconnected with a global bus interface GI1 and a switched bus interface SI1 in the manner shown. Gate switches S4–S20 are controlled through conductors C4–C20 by a switch control logic circuit 160 that is described in more detail in FIG. 9. A processor unit-memory interface 174, which communicates with processor unit P1, may be conventional design.

Referring to FIG. 9, the switch control logic circuit comprises a three bit global interface register 162, a three bit switched interface register 163, a three bit buffer register 165 and a two bit buffer register 166. Data is communicated to registers 162, 163, 165 and 166 through an eleven bit data bus 172. A switch control logic matrix 168 decodes the states of the registers in order to switch control conductors C4–C20 to the appropriate logic states in response to a strobe signal on a strobe conductor 170.

The manner in which the buses B3–B6 and GB can be interconnected by the registers 162, 163, 165 and 166 is described in Tables B, C and D as follows:

TABLE B

Global Bus Interface Connection Codes

| States of Register 162 | Gate Switches In Switched State | Buses In Use |
|---|---|---|
| 0 0 0 | S4 | GB |
| 0 0 1 | S5 | B3 |
| 0 1 0 | S6 | B4 |
| 0 1 1 | S7 | B5 |
| 1 0 0 | NONE | NONE |

TABLE C

Switched Bus Interface Connection Codes

| States of Register 163 | Gate Switches In Switched State | Buses In Use |
|---|---|---|
| 0 0 0 | S5 | B3 |
| 0 0 1 | S6 | B4 |
| 0 1 0 | S7 | B5 |
| 0 1 1 | S8 | B6 |
| 1 0 0 | NONE | NONE |

TABLE D

Switched Bus Buffer Amplifier Connection Codes

| States Of Register 165 | States Of Register 166 | Gate Switches In Switched State | Busses Connected Through Amplifier 151 | Busses Connected Through Amplifier 152 |
|---|---|---|---|---|
| 0 0 0 | 0 0 | S17, S20 | NONE | B4 & B6 |
| 0 0 1 | 0 0 | S12, S14, S17, S20 | B3 & B4 | B4 & B6 |
| 0 1 0 | 0 0 | S12, S15, S17, S20 | B3 & B5 | B4 & B6 |
| 0 1 1 | 0 0 | S12, S16, S17, S20 | B3 & B6 | B4 & B6 |
| 0 0 0 | 0 1 | S18, S19 | NONE | B4 & B5 |
| 0 0 1 | 0 1 | S12, S14, S18, S19 | B3 & B4 | B4 & B5 |
| 0 1 0 | 0 1 | S12, S15, S18, S19 | B3 & B5 | B4 & B5 |
| 0 1 1 | 0 1 | S12, S16, S18, S19 | B3 & B6 | B4 & B5 |
| 0 0 0 | 1 0 | S13, S15, S18, S20 | B4 & B5 | B5 & B6 |
| 0 0 1 | 1 0 | S12, S14, S18, S20 | B3 & B4 | B5 & B6 |
| 0 1 0 | 1 0 | S12, S15, S18, S20 | B3 & B5 | B5 & B6 |
| 0 1 1 | 1 0 | S12, S16, S18, S20 | B3 & B6 | B5 & B6 |
| 0 0 0 | 1 1 | S18, S20 | NONE | B5 & B6 |
| 0 0 1 | 1 1 | S12, S14 | B3 & B4 | NONE |
| 0 1 0 | 1 1 | S12, S15 | B3 & B5 | NONE |
| 0 1 1 | 1 1 | S12, S16 | B3 & B6 | NONE |
| 1 0 0 | 0 0 | NONE | NONE | NONE |

Those skilled in the art will recognize that a variety of conventional switch logic control matrixes 168 can be used to operate control conductors C4–C20 bto achieve the switching modes described in Tables B–D.

Those skilled in the art will also recognize that the embodiment shown in FIGS. 5–9 illustrates a hybrid bus system in which a global, time-shared bus GB can be supported by a network of local dedicated buses B3–B10. They will also recognize that networks N2–N6 can be designed in a manner analogous to network N1 illustrated in FIGS. 8 and 9.

Those skilled in the art will also recognize that the embodiments described herein are merely exemplary of the preferred practice of the invention and that the embodiments may be altered and modified without departing from the true spirit and scope of the invention as defined in the appended claims.

What is claimed is:

1. In a data processing system, improved apparatus for interconnecting a first computer, second computer and third computer each including an arithmetic unit and a memory, said apparatus comprising:
   a first switched bus interface connected to the first computer;
   a second switched bus interface connected to the second computer;
   a third switched bus interface connected to the third computer;
   a first global interface connected to the first computer;
   a second global interface connected to the second computer;
   a third global interface connected to the third computer;
   a first switched bus connected to the first switched bus interface for transmitting data signals in opposite directions;
   a second switched bus connected to the second switched bus interface for transmitting data signals in opposite directions;
   a global bus for transmitting data in opposite directions, said global bus being common to the first, second and third computers;
   first switch means, including control means, switchable into a first state for operatively connecting the first switched bus to the third switched bus interface so that the first computer and the third computer communicate over the first switched bus, switchable into a second state for operatively connecting the second switched bus to the third switched bus interface so that the second computer and the third computer communicate over the second bus, and switchable into a third state for operatively connecting the first switched bus to the second switched bus so that the first and second computers communicate over the first and second switched buses; and
   second switch means for simultaneously connecting the first, second and third global interfaces to the global bus so that the first, second and third computers can receive common messages over the global bus.

2. Apparatus, as claimed in claim 1, wherein the first switch means comprises:
   a first communication link;
   a second communication link connected to the third switched bus interface;
   a third communication link;
   a fourth communication link;
   first gate means for normally transmitting data between the first switched bus and the third communication link and for transmitting data between the first switched bus and the first communication link in response to a first control signal;
   second gate means for normally transmitting data between the first communication link and the second communication link and between the second switched bus and the fourth communication link and for transmitting data between the second switched bus and the second communication link in response to a second control signal;
   third gate means for normally transmitting no data and for transmitting data between the third communication link and the fourth communication link in response to a third control signal; and
   control means for generating the first control signal so that the first computer and the third computer communicate over the first switched bus, for generating the second control signal so that the second computer and the third computer communicate over the second switched bus, for generating the third control signal so that the first and second computers communicate over the first and second switched buses and for simultaneously generating the third control signal and the first or second control signal so that the first, second and third computers simultaneously communicate with each other.

3. Apparatus, as claimed in claim 2, wherein the third communication link comprises a buffer amplifier capable of transmitting data in opposite directions.

4. Apparatus, as claimed in claim 2, wherein each communication link comprises:
   receive conductor means for transmitting data from one of the first and second switched buses toward the third swithced bus interface;
   transmitter conductor means for transmitting data from the third switched bus interface toward one of the first and second switched buses; and
   key conductor means for transmitting a key signal from the third switched bus interface to one of the first and second switched buses.

5. Apparatus, as claimed in claim 4, wherein the second switched bus comprises:
   a fourth receive conductor;
   a fourth transmitter conductor;
   a fourth key conductor;
   receive driver means for receiving data from the second switched bus and for transmitting the data to the fourth receive conductor; and
   transmitter drive means for receiving data from the fourth transmitted conductor and for transmitting the data to the second switched bus in response to a key signal received from the fourth key conductor.

6. Apparatus, as claimed in claim 5, wherein the third communication link comprises:
   a first receive conductor;
   a first transmit conductor;
   a first key conductor;
   a second receive conductor;
   a second transmit conductor;
   a second key conductor; and
   buffer amplifier means for transmitting data from the first receive conductor to the second transmit conductor and for transmitting data from the second receive conductor to the first transmit conductor.

7. Apparatus, as claimed in claim 6, wherein the fourth communication link comprises a third receive conductor, a third transmit conductor and a third key conductor, and wherein the third gate means comprises:
   first logic means for transmitting data from the second transmit conductor to the third transmit conductor and for transmitting data from the second key conductor to the third key conductor in response to the third control signal; and
   second logic means for transmitting data from the third receive conductor to the second receive conductor in response to the third control signal.

8. Apparatus, as claimed in claim 7, wherein the first communication link comprises a fifth receive conductor, a fifth transmit conductor and a fifth key conductor, wherein the second communication link comprises a sixth receive conductor, a sixth transmit conductor and a sixth key conductor, and wherein the second gate means comprises;
   conductor means for operatively connecting the fifth and sixth transmit conductors, for operatively connecting the fifth and sixth key conductors and for operatively connecting the third and fourth receive conductors;
   third logic means for transmitting data from the third transmit conductor to the fourth transmit conductor and from the third key conductor to the fourth key conductor in the absence of the second control signal and for transmitting data from the sixth transmit conductor to the fourth transmit conductor and from the sixth key conductor to the fourth key conductor in response to the second control signal; and
   fourth logic means for transmitting data from the fifth receive conductor in the absence of the second control signal and for transmitting data from the fourth receive conductor to the sixth receive conductor in response to the second control signal.

9. In a data processing system comprising a first computer including a first arithmetic unit and a first memory, and having a first interface connected thereto, said first interface having therein data bus connecting means, a second computer including a second arithmetic unit and a second memory and having a second interface connected thereto, said second interface having therein data bus connecting means, and a third computer including a third arithmetic unit and a third memory and having a third interface connected thereto, said third interface having therein data bus connecting means,
   a first data bus connected to said first and third interfaces for transmitting data signals;
   a second data bus connected to said second and third interfaces for transmitting data signals;
   switch means connected within each of said interfaces, each of said switch means for switching into a first state to connect the associated computer to a connected bus, into a second state to connect two buses to communicate with each other and into a third state to make no connection;

control means connected to said switch means and to at least one of said computers so as to be controlled by signals from said connected computer, said control means when in a first state activating the connection of the first and third computer through the switch means of their respective interfaces over said first bus, when in a second state activating the connection of the second and third computers through the switch means of their respective interfaces over said second bus, or when in a third state activating the connection of the first and second computers through the switch means of their respective interfaces and over the first and second buses by way of a switch connection made in the interface of the third computer.

10. Apparatus, as claimed in claim 9 wherein the switch means of each of said interfaces includes means for switching into a fourth state in which the two connected buses are switched to communicate with each other and to the attached computer and said control means, when in said fourth state, activating the connection of said first, second and third computers through the switch means of their respective interfaces and over the first and second buses by way of a switch connection made in the interface of the third computer.

* * * * *